May 4, 1926.
DE SOTO E. RICHARDSON
1,583,422
CULTIVATOR
Filed March 7, 1924
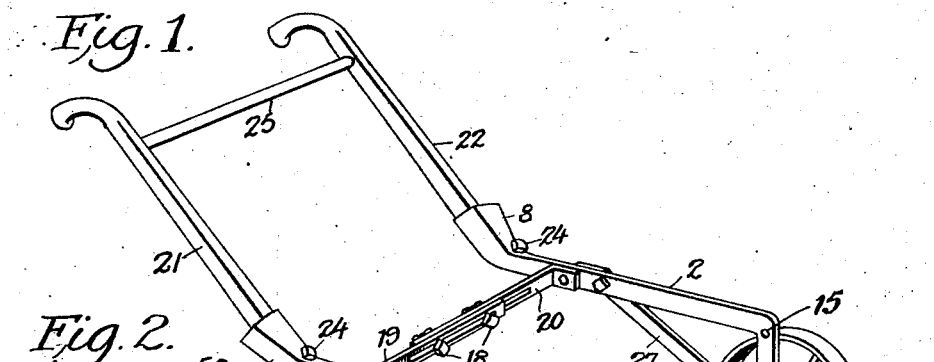
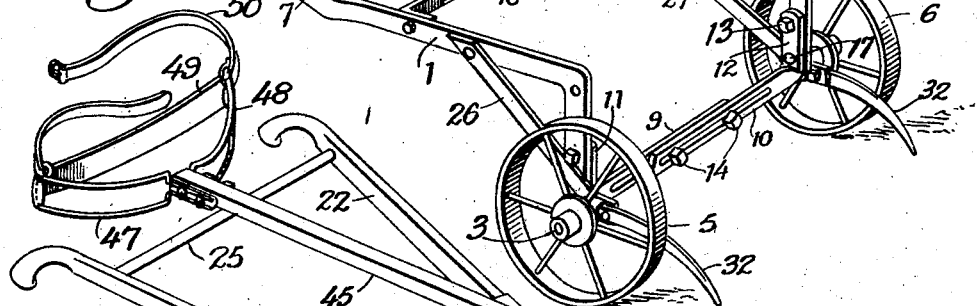
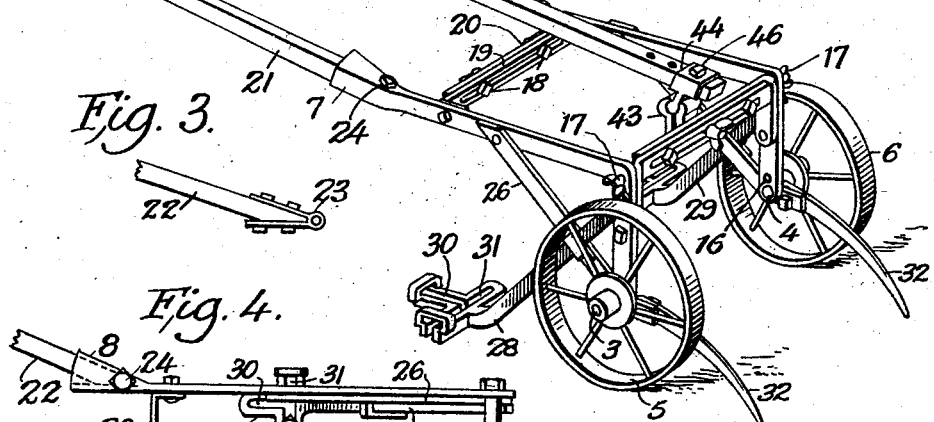
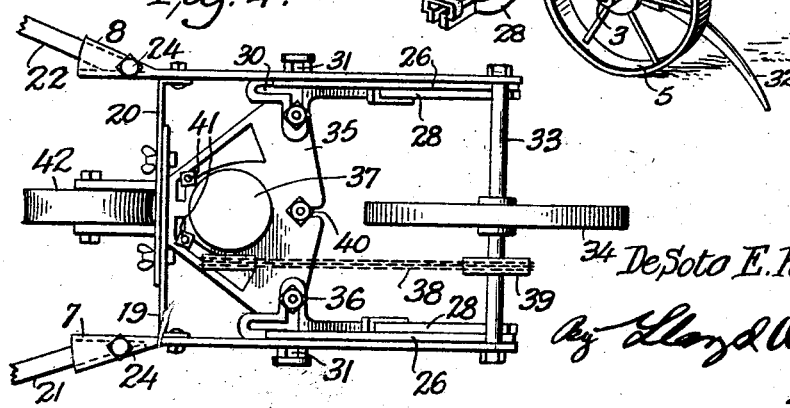
Inventor
DeSoto E. Richardson,
by Lloyd W. Patch
his Attorney Patented May 4, 1926.

1,583,422

UNITED STATES PATENT OFFICE.

DE SOTO E. RICHARDSON, OF RIVERSIDE, WASHINGTON.

CULTIVATOR.

Application filed March 7, 1924. Serial No. 697,667.

*To all whom it may concern:*

Be it known that I, DE SOTO E. RICHARDSON, of Riverside, county of Okanogan, State of Washington, a citizen of the United States, have invented certain new and useful Improvements in Cultivators, of which the following is a specification.

My present invention relates to improvements in cultivators, and particularly to a man operated cultivator of the hand or breast pushed type.

A primary object is to provide a supporting and carrying frame which can be adjusted as to its width, to thus accommodate the implement to different conditions encountered in use, and to adapt the structure to support and carry different earthworking or other implement parts.

A further object resides in providing an axle structure which can be adjusted to vary the width of the supporting frame, and which has a secondary adjustment to a position in alinement with the axes of the carrying wheels when the implement is to be used between the rows of plants or can be elevated to clear the plants when the implement is to be used as a straddle-row weeder or cultivator.

Another object is to so construct the parts that the handles of the implement will be positioned and held in a position, irrespective of adjustments of the width of the frame, for most effective use of the implement.

A still further object is to provide efficient tool holding supports, and to so construct and assemble the various parts that a breast push rod can be used effectively.

With the above and other objects in view, which will be apparent to those skilled in the art, my present invention embodies certain novel features of construction and combinations of parts which will now be set forth.

In the drawing:

Figure 1 is a perspective view of the main supporting and carrying structure.

Fig. 2 is a similar view with the tool holders and push rod in place and showing a different adjustment of the parts.

Fig. 3 is a detail view to better show the manner of connecting the handles so that the frame can be adjusted.

Fig. 4 is a top plan view showing the mounting of a seeder or drill mechanism on the supporting structure.

The side frame members 1 and 2 are substantially L-shaped, and at the ends of their short arms these side members carry the stub shafts 3 and 4. Carrying wheels 5 and 6 are mounted on the stub shafts 3 and 4, and the side frame members are supported by these wheels with their short arms rising substantially vertically from the stub shafts and the long arms extending rearwardly and horizontally. The horizontal portions of the frame members terminate in substantially V-shaped bearing sockets 7 and 8, and these socket portions are inclined upwardly at an angle desired for the implement handles.

An extension axle is made up of the slotted members 9 and 10, which have arms 11 and 12 extending at right angles therefrom. The ends of the arms have openings therethrough, and openings are provided substantially in the centers of the vertically extending frame portions, bolts 13 being fitted in the openings of the arms and the frame to pivotally connect the slotted members between the frame members. Bolts 14 are fitted in the slots to adjustably connect the members, and bolt receiving openings are provided in the arms adjacent the main portions of the members. The vertical portions of the frame members have the openings 15 and 16 therein above and below the pivotal mounting of the slotted members to register with the openings in the arms thereof when the members 9 and 10 are swung down with their slotted portions in line with the stub axles, or are swung up to bridge transversely between the members 1 and 2 substantially at the angles between the vertical and horizontal portions thereof. Clamp bolts and thumb nuts 17 are provided to be fitted through the registering openings to hold the extension axle in either of its adjusted positions.

Slotted cross brace members are secured on the frame members 1 and 2 adjacent the bearing sockets 7 and 8, and bolts 18 are fitted through the slots of these brace members 19 and 20 to be tightened therein to hold adjustments of the width of spacing of the frame.

Handle bars 21 and 22 have bearing straps 23, best shown in Fig. 3, secured on their lower ends, and bolts or pins 24 pass through these bearings to mount the handle bars in the bearing sockets 7 and 8. Cross bar 25 is connected between the handle bars adjacent the handle portions thereof. To give added rigidity to the frame structure, it is preferable that the diagonal brace members 26 and 27 be connected between the horizontal and vertical portions of the frame members 1 and 2 to extend substantially in line with handle bars 21 and 22.

While the desired tools might be connected with and supported from the above structure in any desired manner, it is desirable that the tool holders 28 and 29 be connected with the frame members 1 and 2 to extend rearwardly beneath the horizontal portions thereof, after the manner shown in Fig. 2. The tool holders have longitudinal slots therein extending from the transverse slots, and the open ends of these slots 30 and 31 are bridged over to permit fitting of a tool shank without removal of the fastening nut. If desired, vine guards or clearers 32 can be connected to extend forwardly adjacent the wheels 5 and 6.

With the form and arrangement of the parts as shown in Fig. 4, the stub shafts or axles 3 and 4 are removed and a single axle member 33 is substituted, the cross brace members 19 and 20 being retained in place. A single wheel 34 is carried on the axle 33, and a seeder or drill carrying plate 35 is rigidly connected with the tool holders 28 and 29 by means of bolts 36, fitted in the slots thereof. The seed box is mounted on this plate, as indicated at 37, and a drive chain 38 operating the dropper mechanism is carried over sprocket wheel 39 revolving with the wheel 34. A furrow opening tool 40 is carried by the plate 35 in advance of the seed box and covering tools 41 are carried in the rear, a packing wheel 42 being mounted to trail from the plate.

This structure can be used as a hand pushed implement, or a push rod can be applied in the manner shown in Fig. 2. In this adaptation the socket member 43 is secured in the middle of the raised axle members and a sleeve member 44 is provided with a ball portion fitted within the socket. The push rod 45 fits in sleeve 44, and is provided with a plurality of openings to adjustably receive pin 46 associated with the sleeve to thus vary the length of the bar between handles 21 and 22. Arms 47 and 48 extend in spread relation from the free end of the push rod and an adjustable breast strap 49 is connected with these arms. A shoulder strap 50 is connected with the arms 47 and 48 to support the breast strap at the proper point.

When the width of space between the frame members is adjusted, bar 25 maintains the fixed spacing of the handles, and the bearing sockets serve to hold the handles secure.

While I have herein shown and described only certain possible adaptations and uses of my improved structure, it will be appreciated that other changes and variations can be made in the form, arrangement and use of the structure without departing from the spirit and scope of my invention.

I claim:

1. A cultivator comprising a frame including side members, carrying wheels by which said frame is supported, and a substantially U-shaped axle pivoted at its ends to the side frame members to be swung down to extend in line with the wheel axis when the implement is used between rows of plants and to be swung up to bridge the plants when the device is used as a straddle-row implement.

2. A cultivator comprising side frame members of substantially inverted L-shape, carrying wheels mounted at the lower ends of the vertical arms of the frame members, a substantially U-shaped cross-axle member pivoted at its ends upon the vertical arms of said frame members to be swung down into line with the turning axis of the wheels when the implement is used between rows of plants and to be swung up to bridge the plants when the device is used as a straddle-row implement, handle bars pivoted on the frame members and extending rearwardly therefrom, said U-shaped member being extensible to vary the width of spacing between the frame members, an adjustable cross bar connecting the side members adjacent the connection of the handles therewith, bridged slot tool holders carried by the frame, and a fixed cross bar connected between the handle bars adjacent the handle portions thereof.

3. A cultivator comprising a pair of side frame members of substantially inverted L-shape, a pair of substantially L-shaped members adjustably connected together to form a substantially U-shaped axle portion, carrying wheels mounted at the lower ends of the side frame members, pivotal connections between the ends of the axle portion and the vertical arms of the side members, handle bars pivotally connected with the side frame members and extending rearwardly therefrom, an extensible cross brace member joining the side members adjacent the mounting of the handles, a fixed cross bar connecting the handle bars adjacent their rear extremities, tool holders carried by the frame structure, and an adjustable breast-pushing structure pivotally connected with the frame structure and extending between the handle bars.

In testimony whereof I hereunto affix my signature.

DE SOTO E. RICHARDSON.